UNITED STATES PATENT OFFICE.

FRANCIS J. OSWALD, OF NEW YORK, N. Y.

IMPROVEMENT IN COMPOUNDS FOR CURE OF TOOTH-ACHE.

Specification forming part of Letters Patent No. 134,217, dated December 24, 1872.

*To all whom it may concern:*

Be it known that I, FRANCIS J. OSWALD, of the city, county, and State of New York, have invented a new and Improved Tooth-Ache Compound, of which the following is a specification:

My improved compound for the cure of tooth-ache consists of one hundred drops essence of bergamot, one hundred drops essence of citron, sixty drops essence of lavender, twelve drops essence of romaine, one hundred drops essence of neroli, mixed in one quart of alcohol.

The application is to be made by a piece of cotton-wadding or any equivalent absorbent material wet with a few drops of the compound and placed on the tooth or the gum alongside of it, and renewed from time to time until the pain is removed.

For chronic tooth-ache the application should be continued for a few days.

Although when first applied a sharp burning sensation is produced, it does no harm, and very soon ceases. When properly applied a radical cure is effected.

Having thus described my invention, I claim as new and desire to secure by Letters Patent—

The improved compound for tooth-ache, substantially as above described.

F. J. OSWALD.

Witnesses:
   T. B. MOSHER,
   ALEX. F. ROBERTS.